Nov. 10, 1931.  J. G. CAPSTAFF  1,831,796
METHOD AND APPARATUS FOR REPRODUCING PHOTOGRAPHIC SOUND RECORDS
Filed March 21, 1930
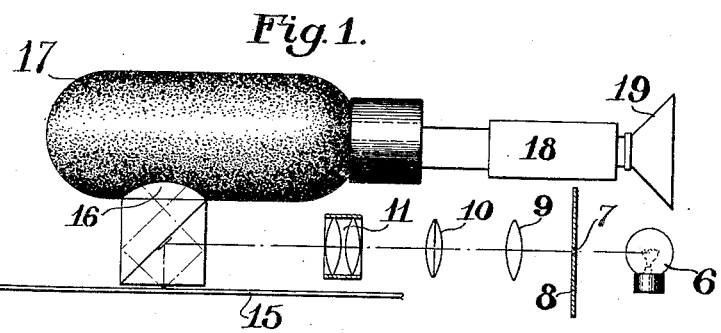
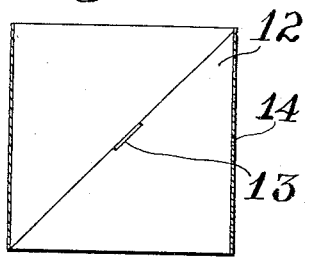
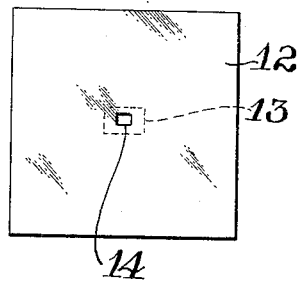
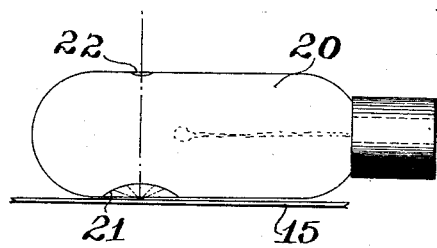
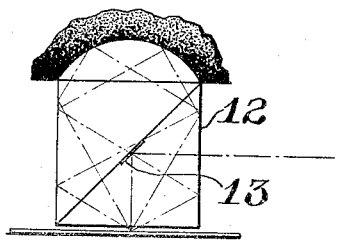
John G. Capstaff.
Inventor
By Newton M. Perrins
Attorney Patented Nov. 10, 1931

1,831,796

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

METHOD AND APPARATUS FOR REPRODUCING PHOTOGRAPHIC SOUND RECORDS

Application filed March 21, 1930. Serial No. 437,856.

This invention relates to the method of and apparatus for reproducing photographic sound records.

It has been proposed to use paper and other similar materials for the recording thereon of sound images formed either photographically or by printing. However, since such a record is opaque, it is necessary that the light or other radiations varying in accordance with the sound record, be reflected therefrom as distinguished from being transmitted through the record as when it is formed on a transparent base. The reflection of the rays from such an opaque sound record has resulted in the loss of so much radiation due to the difficulty in concentrating the reflected rays on the radiation sensitive element, that such records are not generally satisfactory.

In accordance with the present invention it is therefore proposed to employ a novel method of reflecting from the surface of the sound record radiations varying in accordance with sound whereby the reflected rays are concentrated on the radiation sensitive element instead of being in large part uselessly scattered or dispersed. A further feature of the invention relates to the method of transmitting radiations from the radiation source parallel to the plane of the record, then transmitting said radiations to the record in a plane normal thereto, subsequently reflecting radiations varying in accordance with the sound record therefrom, and finally concentrating the varying reflected radiations on the radiation sensitive element.

For a clearer understanding of the invention reference is made to the drawings in which Fig. 1 is a diagrammatic showing of a photographic sound record reproducing system illustrating one form of the present invention; Figs. 2 and 3 are respectively side and front views of an optical cube for use in the system of Fig. 1; Fig. 4 is a schematic showing, indicating how the radiations from the radiation source are reflected onto the sound track and are then collected and totally reflected within the optical cube so that the major portion of the rays reflected from the sound track eventually reach the radiation sensitive element; and Fig. 5 represents a modified form of radiation sensitive element which may replace the optical cube and the corresponding radiation sensitive element in the system of Fig. 1.

Referring to Fig. 1, 6 designates a lamp or other suitable source of radiations, certain of which radiations pass through the physical slit 7 in the support 8 and are then transmitted through the combination of lenses 9, 10 and 11 to the optical cube 12, which is preferably formed of a low radiation absorbing material such as quartz. This cube, shown in Figs. 2 and 3, has a mirrored strip 13 in a plane intersecting the diagonal corners of the cube and its sides with the exception of a window 14 opposite strip 13 may be covered with a reflecting material although for ordinary purposes this is not found necessary. The top and bottom of the cube, however, are left unmirrored. The radiations passing through window 14 and incident on the mirrored strip 13 are then transmitted to the sound track of a photographic sound record 15. These radiations now varying in accordance with the sound record, are reflected from the sound record as indicated by the rays shown in Fig. 1. As more clearly shown in Fig. 4, these rays are reflected at widely varying angles into the optical cube 12 wherein they are collected and totally reflected through the window 16 of a photoelectric cell 17 or other radiation sensitive element. This photoelectric cell is electrically connected to an amplifier 18, preferably of the vacuum tube type so that feeble photoelectric currents developed thereby are sufficiently amplified to actuate the loud speaker 19 or other sound regenerating device connected to the output of the amplifier 18.

Instead of using the form of cube shown in Figs. 1 and 4, a modified form of photoelectric cell 20 as shown in Fig. 5 may be substituted for this cube and the photoelectric cell 17 of Fig. 1. This modified form of photoelectric cell has the inner surface of its glass envelope, with the exception of the window 21 and the aperture 22, coated with a material which is sensitive to light or other radiations incident thereon. In this arrangement light or other radiations from a suitable source pass through the aperture 22 and the window 21 onto the surface of the sound track of the strip 15. These radiations are then reflected through photoelectric cell window 21 positioned in close relation to the sound track on the strip 15.

It will be understood that this disclosure is merely typical of this invention and that there may be many variations and modifications within the scope of the appended claims without departing from the spirit of the present invention.

What I claim is:

1. The method of reproducing a photographic sound record on a photographic strip, which comprises transmitting radiations to the sound record of said strip, totally reflecting in an optical medium dispersed radiations from said strip varying in accordance with said record, and translating said varying, totally reflected radiations into sound.

2. The method of reproducing an opaque photographic record which comprises reflecting uniform radiations onto the surface of said strip, reflecting varying radiations from said strip, collecting and totally reflecting said varying radiations in an optical medium, and translating the varying radiations into sound.

3. The method of reproducing an opaque photographic record which comprises reflecting uniform radiations onto the surface of said strip, reflecting varying radiations from said strip, totally reflecting said varying radiations in an optical medium, translating said totally reflected varying radiations into electrical current, and translating said varying electrical current into sound.

4. In combination with a strip having a photographic record thereon, a radiation sensitive element for translating radiations into electrical current, a transparent totally reflecting cube having a reflecting strip in a plane intersecting the diagonal corners of said cube, one face of said cube being substantially parallel to said photographic strip, said cube serving to concentrate radiations reflected from said strip onto said element.

5. In a system for transmitting electrical signals from a record, a radiation sensitive element, an electrical circuit including said element and means for reproducing signals, a transparent cube having a reflecting strip in a plane intersecting diagonal corners of said cube, one face of said cube being close to said element, and means for directing a light beam upon said reflecting surface, whereby said beam may be reflected through the face of the cube opposite the first named face upon a record and thence by total reflection within the cube to the element.

Signed at Rochester, New York this 13th day of March 1930.

JOHN G. CAPSTAFF.